United States Patent [19]

Zirps

[11] Patent Number: 4,988,147
[45] Date of Patent: Jan. 29, 1991

[54] HYDRAULIC HIGH-PRESSURE PUMP FOR A VEHICLE BRAKE SYSTEM

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 459,172

[22] Filed: Dec. 29, 1989

[30] Foreign Application Priority Data

Mar. 11, 1989 [DE] Fed. Rep. of Germany ....... 3907969

[51] Int. Cl.$^5$ .......................... B60T 8/32; F04B 21/02
[52] U.S. Cl. ...................................... 303/116; 303/10
[58] Field of Search ........................... 303/116, 10–12, 303/61, 114, 113, 68; 188/181 R; 60/591; 417/540

[56] References Cited

U.S. PATENT DOCUMENTS

| | | | |
|---|---|---|---|
| 3,756,666 | 9/1973 | Leiber | 303/116 X |
| 4,354,715 | 10/1982 | Farr et al. | 303/116 |
| 4,568,131 | 2/1986 | Blomberg et al. | 303/116 X |
| 4,730,879 | 3/1988 | Adachi et al. | 303/116 |
| 4,779,936 | 10/1988 | Farr | 303/116 |
| 4,887,870 | 12/1989 | Siegel | 303/116 |
| 4,892,363 | 1/1990 | Burgdorf | 303/116 |

FOREIGN PATENT DOCUMENTS

| | | |
|---|---|---|
| 2643860 | 3/1978 | Fed. Rep. of Germany. |
| 3236536 | 4/1984 | Fed. Rep. of Germany. |
| 1590003 | 5/1981 | United Kingdom. |

Primary Examiner—Douglas C. Butler
Attorney, Agent, or Firm—Edwin E. Greigg

[57] ABSTRACT

The pump having a housing with a bore for receiving a pump cylinder having a pump piston, which is drivable by a cam. An outlet valve housing is disposed, coaxially with the cylinder, in an enlarged portion of the bore. An annular chamber formed thereby encompasses the outlet valve and is closed off by a cap. The pump piston cylinder, the outlet valve and the cap are retained by a closure screw in the pump housing, which screw is screwed into the bore portion. In combination with a pump outlet bore embodied as a throttle, the annular chamber acts as a damper chamber for the brake fluid that in this type of pump is pumped discontinuously. Because of the damper chamber and pump outlet bore, pressure vibrations of the brake fluid reduced, and an impetus toward vibration of the vehicle body during a pump operation is avoided, so that noise generation in the interior of the vehicle is largely suppressed.

12 Claims, 1 Drawing Sheet

HYDRAULIC HIGH-PRESSURE PUMP FOR A VEHICLE BRAKE SYSTEM

BACKGROUND OF THE INVENTION

The invention is based on a high-pressure pump for a vehicle brake system. A high-pressure pump of this kind is known from German Offenlegungsschrift No. 32 36 536. The pump is used to return brake fluid from a wheel brake cylinder to the master brake cylinder of a brake system. This pump is a time-tested design, but has a disadvantage of irregularity of the pumped flow and of a resultant fluctuation in pressure of the brake fluid. The pump piston in fact aspirates and pumps fluid only during one-half of a cam revolution. With the pump switched on in anti-skid operation, the irregularity of the pumped flow is transmitted to the master brake cylinder and causes vibration of the brake pedal. Although this is desirable to a certain extent, to make the driver aware of the critical driving situation, nevertheless the vibration also causes oscillation of the vehicle body, which causes irritating noises in the interior of the vehicle. A brake system for vehicles having an anti-skid system or ABS is also known from German Offenlegungsschrift No. 26 43 860, in which after the outlet valve, in the flow direction of the brake fluid, the hydraulic high-pressure pump is followed by a damper chamber having a throttle bore on the outlet side. This chamber, as a hollow chamber disposed spaced apart from the pump and created by metal-cutting techniques, is contained in a housing. In the first patent above, although an annular chamber surrounding the valve housing is present following the pump outlet valve in the flow direction of the brake fluid, nevertheless the annular chamber is not followed on the outlet side by a throttle. The relatively small annular chamber is therefore unable to develop any damping action in the sense of smoothing out the pressure vibration of the pulsating pumped flow.

OBJECT AND SUMMARY OF THE INVENTION

A high-pressure pump according to the invention, has an advantage over the prior art that a damper chamber can be created in a simple manner. This is done by corresponding dimensioning of the annular chamber, which is necessary in any case for carrying away fluid, and by embodying the pump outlet bore as a throttle. The expanded annular chamber can be created in one operation, in the course of production of the bore for receiving the pump cylinder and the outlet valve housing. As a result, the production costs for the damper chamber in combination with the production of the throttle bore are low. Because the damper chamber is disposed concentrically to the outlet valve, it is attainable with relatively little structural space required in the pump housing. Moreover, because of its direct spatial association with the outlet valve, the effectiveness of the damper chamber is very high, since this provision avoids lines that radiate vibration.

Disclosures on suitable dimensioning of the damper chamber and throttle bore are provided herein.

Advantages of this invention are brought about because a positional securing of the cap and valve housing is attained with a single closure element. This provision has an effect of reducing the production cost for the high-pressure pump.

Further advantages are brought about because a outlet valve housing surrounded by the damper chamber on its periphery undergoes a positional fixation in the radial direction in a simple manner.

The invention will be better understood and further objects and advantages thereof will become more apparent from the ensuing detailed description of a preferred exemplary embodiment taken in conjunction with the drawings.

DESCRIPTION OF THE PREFERRED EMBODIMENT

Figure 1:
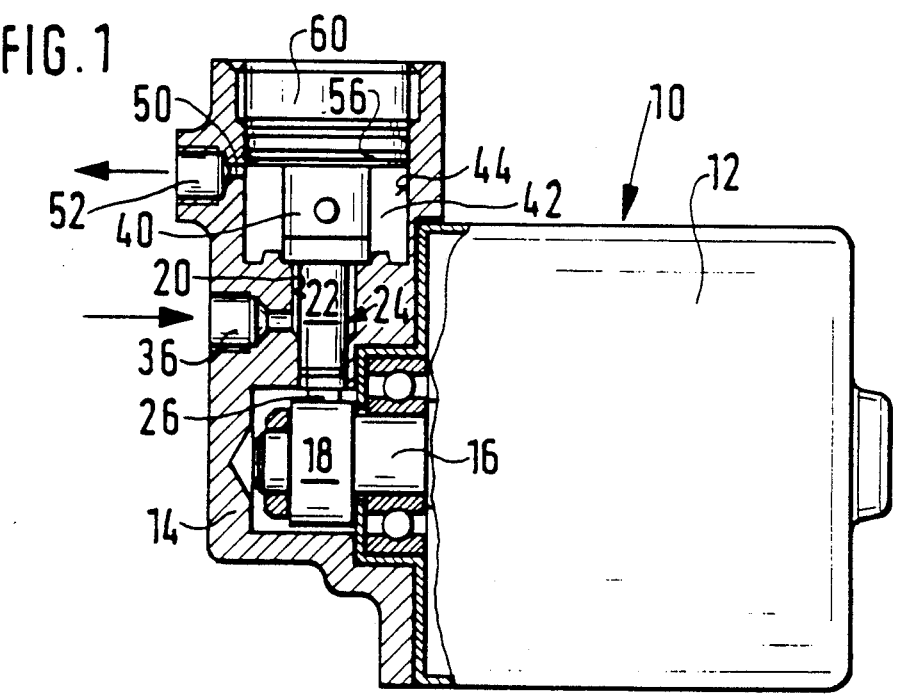
FIG. 1 is a partial sectional side view of a high-pressure pump embodied in accordance with the invention, with the pump housing shown cut away.

The hydraulic high-pressure pump 10 shown in the drawing has an electric drive motor 12, which is connected in a manner not shown to a pump housing 14 (FIG. 1). A shaft 16 of the drive motor 12 extends into the inside of the pump housing 14 and is provided with a cam 18.

Figure 2:
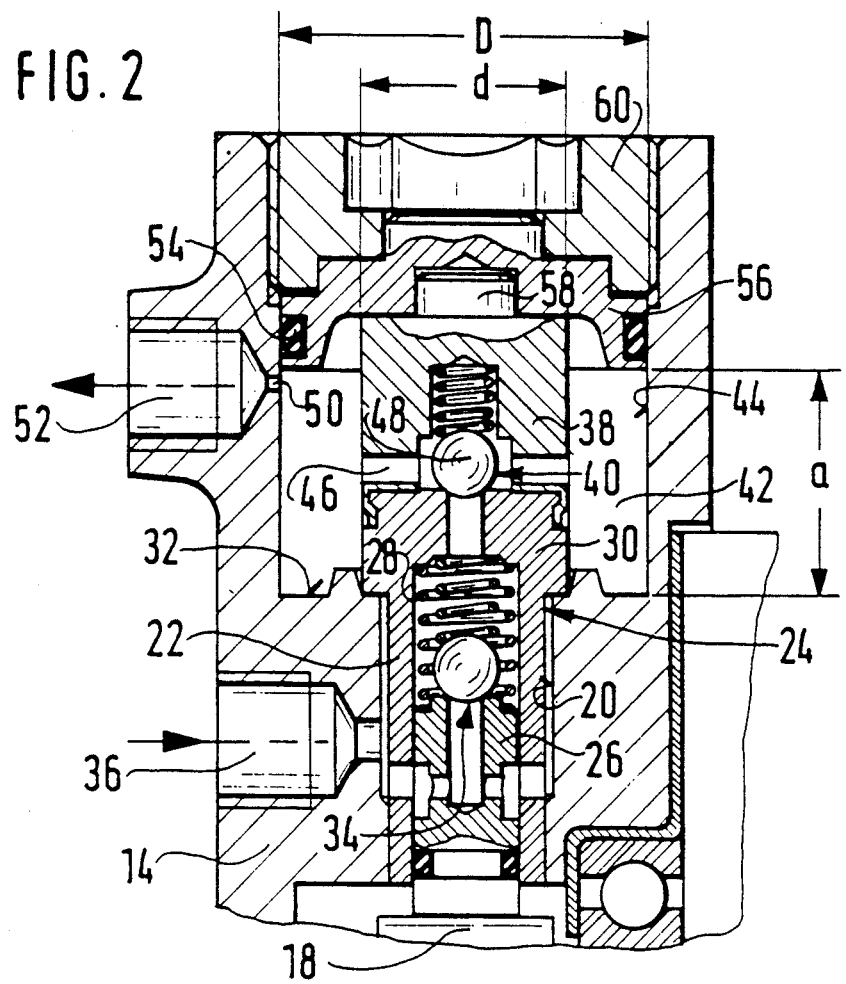
FIG. 2 shows a cross sectional view of the pump housing with built-in components on a different scale from FIG. 1.

The pump housing 14 has a bore 20 extending radially to the pump motor shaft 16. A piston cylinder 22 of a radial piston pump 24 is fitted tightly into the bore 20, and a pump piston 26 operative within the piston cylinder engages the cam 18 under the influence of a compression spring in a spring chamber 28 (FIG. 2). The pump piston cylinder 22 is axially supported on a bore step 32 of the pump housing 14 by a collar 30, and includes therein an intake valve 34, which communicates with a pump inlet 36 via a radial bore in the pump piston cylinder 22, and a radial bore in the piston 26 which extends to an axial blind bore in the piston 26.

On the outlet side, the pump piston cylinder 22 is connected by a crimp connection to a cylindrical housing 38 of an outlet valve 40 of the radial piston pump 24. On its side oriented toward the cam 18, the outlet valve housing 38 is supported on the pump piston cylinder 22 and extends coaxially with it. Extending around the circular-cylindrical outlet valve housing 38, which has a substantially constant diameter, is an annular chamber 42, which is embodied by a portion 44 of expanded diameter of the pump housing bore 20. Radial outlet conduits 46 of the outlet valve 40, which has a spring-loaded valve ball 48, discharge into the annular chamber 42. Also communicating with the annular chamber 42 is a small diameter bore 50, embodied as a throttle, of a pump outlet 52.

The annular chamber 42 is defined toward the cam by the bore step 32 that extends substantially radially On its side remote from the cam 18, the annular chamber 42 is closed off by a cap 56, introduced tightly into the constant-diameter bore portion 44 of the pump housing 14, with the aid of an 0-ring 54 leakage is prevented. The cap 56 is supported on the outlet valve housing 38, and includes a blind bore which receives a centering tang 58 of the outlet valve housing 38. A closure screw 60 is also provided, which is screwed into the bore portion 44. Aside from its function as a closure for the housing bore 20 and bore portion 44, the closure screw 60 also serves to fix the cap 56, outlet valve housing 38, and pump cylinder 22 in the axial direction in the pump housing 14.

The mode of operation of the pump is as follows:

The drive motor 12 is excited to rotate the cam 18 which in turn drives the pump piston 26. As the pump piston 26 descends, brake fluid is admitted through the inlet 36 which opens the intake valve 34 to permit fluid to flow into the spring chamber 28, at this time and with the outlet valve 40 closed. After the pump 24 aspirates brake fluid into the pump cylinder 22 through the pump inlet 36, the cam rotates so that the pump piston 26 is in the upward stroke. During the upward stroke, the outlet valve 40 opens and the intake valve 34 closes so that the fluid is forced through the outlet conduits 46 of the outlet valve housing 38 into the annular chamber 42. The brake fluid leaves the annular chamber 42 through the pump outlet bore 50 of the pump outlet 52 due to the upward movement of the pump piston 26.

The radial piston pump 24 pumps the brake fluid in a discontinuous stream. The brake fluid is therefore expelled pulsatingly through the outlet conduits 46 of the outlet valve 40 into the annular chamber 42. In this process the kinetic energy imparted by the pump 24 to the brake fluid is converted into potential energy. Because of the volume of the annular chamber 42, the annular chamber acts in combination with the throttling pump outlet bore 50 as a damping chamber, in which predominantly because of the compressibility of the brake fluid, damping of the pressure vibrations occurring in the fluid is attained. The brake fluid flowing out of the pump outlet 52 is therefore low in pressure vibrations because of the large volume of the annular chamber 42 and the small diameter of the throttle 50.

Good damping action of the annular chamber 42 is attainable if the free volume of the annular chamber is equivalent to at least 30 times one pump stroke feed volume. In the design of the abovedescribed high-pressure pump 10, this relationship is attained by providing that the spacing a between the bore step 32 and the cap 56 is equivalent to approximately the outer diameter d of the outlet valve 40, and the diameter D of the annular chamber 42 is equivalent to at least 1.5 times the diameter d of the outlet valve housing. An essential factor in the effectiveness of the damper chamber is also the diameter of the pump outlet bore 50. At a pump stroke feed volume of 100 mm$^3$, for example, the diameter of the pump outlet bore 50 should preferably be less than 1 millimeter.

The high-pressure pump 10 in the exemplary embodiment described has only one pump unit, embodied by a piston cylinder 22 and pump piston 26. Instead, the high-pressure pump 10 may be equipped with a plurality of pump units, each associated with one brake circuit of the vehicle brake system.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A hydraulic high-pressure pump (10) for a brake system of a vehicle equipped with an anti-skid braking system, having a housing (14), at least one bore (20) in said housing, a pump cylinder (22) in said bore, a pump piston (26) disposed in said pump cylinder (22), and movable by a cam (18), an outlet valve (40) including a substantially cylindrical housing (38) supported coaxially on said pump cylinder (22) on a side remote from the cam (18), which outlet valve is seated in an enlarged, circular-cylindrical portion (44) of the bore (20) surrounding said outlet valve (40) to form an annular chamber (42), said outlet valve includes at least one outlet conduit (46) which discharges into said annular chamber (42), an outlet (52), a pump outlet bore (50) beginning at said enlarged bore portion (44) which extends to said outlet (52), means for closing the housing bore (20) and for retaining said pump piston cylinder (22) and said outlet valve housing (38) in the bore (20) of said pump housing (14), said annular chamber (42) is defined toward the cam substantially by a bore step (32) and a bore portion (44) of the pump housing (14) and away from the bore step (32) by a cap (56) fitted tightly into the bore portion (44), said annular chamber (42) has a dimension such that in combination with said pump outlet bore (30) a sufficient damping action occurs for smoothing out any pressure vibrations of any pulsating pumped fluid flow, said cap (56) engages the outlet valve housing (38), thereby forming a fluid volume in said annular chamber (42) and said pump outlet bore (50) is embodied as a throttle.

2. A pump as defined by claim 1, in which the fluid volume of said annular chamber (42) is equivalent to at least 30 times one pump stroke feed volume.

3. A pump as defined by claim 1, in which a distance (a) between said bore step (32) and the cap (56) is approximately equivalent to a diameter d of the outlet valve housing (38), and the diameter (D) of the annular chamber (42) is substantially equal to at least 1.5 times the diameter (d) of the outlet valve housing.

4. A pump as defined by claim 2, in which a distance (a) between said bore step (32) and the cap (56) is approximately equivalent to a diameter d of the outlet valve housing (38), and the diameter (D) of the annular chamber (42) is substantially equal to at least 1.5 times the diameter (d) of the outlet valve housing.

5. A pump as defined by claim 1, in which with a pump stroke feed volume 100 mm$^3$, a diameter of the pump outlet bore (50) is less than 1 mm.

6. A pump as defined by claim 2, in which with a pump stroke feed volume of 100 mm$^3$, a diameter of the pump outlet bore (50) is less than 1 mm.

7. A pump as defined by claim 3, in which with a pump stroke feed u volume of 100 mm$^3$, a diameter of the pump outlet bore (50) is less than 1 mm.

8. A pump as defined by claim 4, in which with a pump stroke feed volume of 100 mm$^3$, a diameter of the pump outlet bore (50) is less than 1 mm.

9. A pump as defined by claim 1, in said cap (56) is engaged by a closure screw (60) screwed into the bore portion (44), with which closure screw both the cap (56) and the outlet valve housing (38) are retained in the housing bore (20).

10. A pump as defined by claim 2, in said cap (56) is engaged by a closure screw (60) screwed into the bore portion (44), with which closure screw both the cap (56) and the outlet valve housing (38) are retained in the housing bore (20).

11. A pump as defined by claim 1, in which said outlet valve housing (38) includes a centering tang (58) which engages a centering blind bore on an inside surface of said cap (56).

12. A pump as defined by claim 2, in which said outlet valve housing (38) includes a centering tang (58) which engages a centering blind bore on an inside surface of said cap (56).

* * * * *